Aug. 12, 1969  J. C. BOYLE  3,460,381
BALANCE TORQUEMETER

Filed Aug. 30, 1967  2 Sheets-Sheet 1

FIG.I.

INVENTOR
Joseph C. Boyle

BY

ATTORNEYS

INVENTOR
Joseph C. Boyle

United States Patent Office 3,460,381
Patented Aug. 12, 1969

---

3,460,381
BALANCE TORQUEMETER
Joseph C. Boyle, Rockville, Md., assignor to the United States of America as represented by the Administrator of the National Aeronautic and Space Administration
Filed Aug. 30, 1967, Ser. No. 665,209
Int. Cl. G01l 3/10
U.S. Cl. 73—133    6 Claims

ABSTRACT OF THE DISCLOSURE

A balance torquemeter for measurement of small torques, particularly those caused by a magnetic dipole moment acting upon a massive body, where the body is uncoupled from the torsional stiffness of conventional solid support systems by a hydrostatic support technique enabling measurements under frictionless conditions and where the opposing angular torque is provided by a fine torsion wire.

---

The invention described herein may be manufactured and used by and for the Government of the United States of America for govenmental purposes without payment of any royalties thereon or therefor.

DISCLOSURE

The present invention relates generally to torque measurement, and more particularly to an apparatus for determining the magnitude, acting upon a test specimen, of the torques which are generated by the interaction between the magnetic dipole of a test specimen and ambient magnetic fields.

A permanent magnet or a bar of soft iron tends to align itself with the earth's magnetic field. The strength of this tendency is determined by a property of the object called the "magnetic moment." Since the geomagnetic field of the earth is not confined to the surface of the earth, even those objects which are traveling in outer space are subject to forces arising from interactions with our magnetic field. Accordingly, if a spacecraft in orbit has a significant magnetic moment, the geomagnetic fields will produce a torque upon the spacefract which, if undesirable, can only be counteracted by the wasteful expenditure of energy in an opposing manner. On the other hand, attitude control systems can be designed to make use of such magnetically induced torques to stabilize or control a spacecraft.

It is important to know, prior to lanuch, the magnetic moment of a spacecraft because through magnetic balancing techniques, this moment can be reduced to an insignificant value, or its effects can be taken into consideration.

There are several methods in the prior art for measuring magnetic moment. The most common is to measure the magnetic field due to the test specimen. When making measureemnts on large specimens with small magnetic moments, this method gives poor results because it becomes necessary to make measurements at distances great enough so that the assemblage resembles a simple magnetic dipole. However, when these distances become large, the field intensity for small dipole moments is so low as to prohibit accurate measurements. Another method entails the use of a test specimen as the rotor of a permanent magnet alternator using the electrical output of the alternator as a measure of the dipole moment. This method requires complicated equipment and is obviously impractical for anything so massive as an entire spacecraft. In the ideal situation it is desirable to be able to test an entire spacecraft in a magnetically isolated environment which would enable measurement of the magnetic moment or allow determination of the magnitude and sense of control torques generated by a satellite control system upon command.

Accordingly, it is the object of the present invention to provide simplified equipment to perform a simple, direct measurement of torques upon a test specimen.

Another object of the invention is to provide simplified equipments for accurately measuring feeble torque produced upon a heavy mass.

Another object of the invention is to provide simplified equipments for accurately and rapidly measuring torque produced upon a heavy mass.

Another object of the invention is to provide a feeble torque measuring means with a short adjustable settling time.

Another object of the invention is to provide a means of decoupling large masses from the torsional stiffness of a solid support system thereby enabling the measurement of feeble torques which act thereupon.

Further objects as well as features and attending advantages o fthe invention will become apparent from the following description when taken in conjunction with the accampanying drawings, in which.

According to the present invention, in order to determine directly the torque acting upon a massive body, the body is mounted on a suitable frame which is provided hydrostatic support and which decouples the mass from the torsional stiffness of a solid support system. A centrally mounted vertically oriented torsion member affixed to the pedestal and to ground provides angular compliance to applied torques about the central axis. For the torsion member, a fine wire having an appropriately soft torsional resistance may be used because the mass of the specimen is not being supported by the torsion member. To minimize settling-out time, adjustable velocity type dampers are provided to impede and damp torsional oscillation of the specimen and to facilitate rapid stable measurements of disturbing torques.

Discussed in detail in the following description, is a particular embodiment of the invention for determining the magnetic torque upon a massive body, such as may be experienced by a satellite having a magnetic moment when acted upon by the geomagnetic fields of the earth. It is to be understood however, that the underlying concepts are equally applicable to torque measurements arising from control torque devices such as momentum wheels, gas, ion, or microthrust propulsion jets, electromagnetic pressures due to transmission or reception of radio frequency or optical energies, transmission of circularly polarized energy, electric dipole moments, or eddy current interactions.

Figure 1:
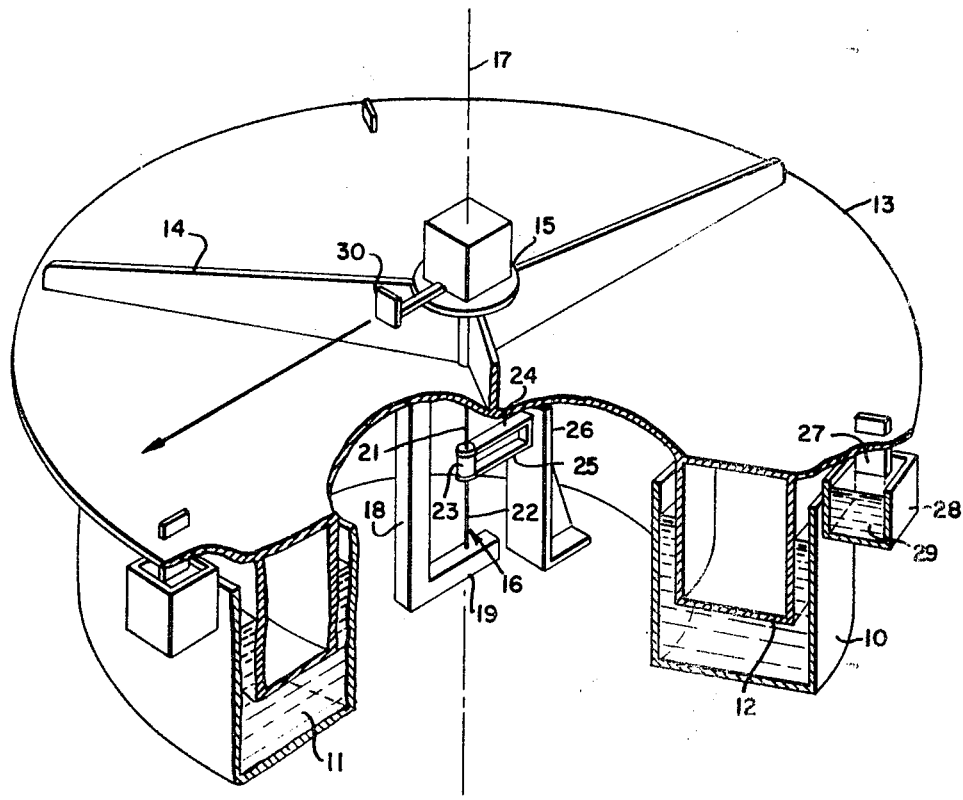
FIGURE 1 is a plan view, in partial section, of one embodiment of the apparatus used in carrying out the invention.

With reference to FIGURE 1, the torque meter assembly is comprised of an annular water tight basin or container 10 having an open upper end. The basin is filled with a liquid, preferably water 11 in which the contaminates have been removed; however, other fluids have been used, the only requirement being that the fluid must exhibit newtonian viscosity characteristics, i.e., zero shear resistance at zero velocity. An annular enclosed pontoon member 12 having a smaller width than the width of the annular basin 10 is buoyantly floated upon the fluid within the basin. Resting upon the pontoon 12 is the support frame 13 and support frame web 14 which provide structural rigidity for the centrally located specimen mounting pad 15. The torsion wire 16 is located along the central axis indicated by 17 of the torque meter and is colinear with the central axis of the annular pontoon 12. The torsion wire is provided some small amount of tension to restrain radial motion of the pontoon 12. The torsion bracket 18 having a lower arm 19 and an upper arm 20, not shown, is affixedly attached at its upper arm to the bottom of the support frame 13. An upper portion of the torsion wire 16 indicated at 21 is connected to the upper arm 20 at the exact point at which the center line passes through the upper arm, and the lower section indicated by 22 of the torsion wire 16 is connected to the lower arm 19 along the center line. A tie block 23 which is centrally fastened by any appropriate means, i.e., clamping, welding, etc. to torsion wire 16 is clamped to the upper and lower parallel flat flexure members 24 and 25, respectively. The flexure members are adapted to rigidly clamp and restrain the torsion wire 16 with respect to rotation, while permitting flexing in the vertical direction to accommodate some vertical motion of the pontoon 12. Both parallel flexure members are attached to a fixed support bracket 26, which bracket serves as the stable reference for the invention. A plurality of vertically adjustable damper paddles 27 are movably attached to the support frame 13 and are immersed in a fluid in the damper basin 28. A plurality of fluid filled containers disposed at 120° intervals about the periphery of the support frame web comprise the damper basin 28. The damper basins are filled with a damper fluid 29, the viscosity characteristics of which control the critical damping factor. Annular pontoon 12 may be filled with air at one atmosphere or may be filled with any fluid that is less dense than the fluid in the annular basin 10. The amount of buoyancy desired depends on the mass of the test specimen and on the permissible vertical motion of the torsion wire 16 and flexure members 24 and 25. Reference mirror 30 is shown attached to the specimen mounting pad 15 preferably with its plain reflective face perpendicular to the radius of the annular pontoon.

Figure 2:
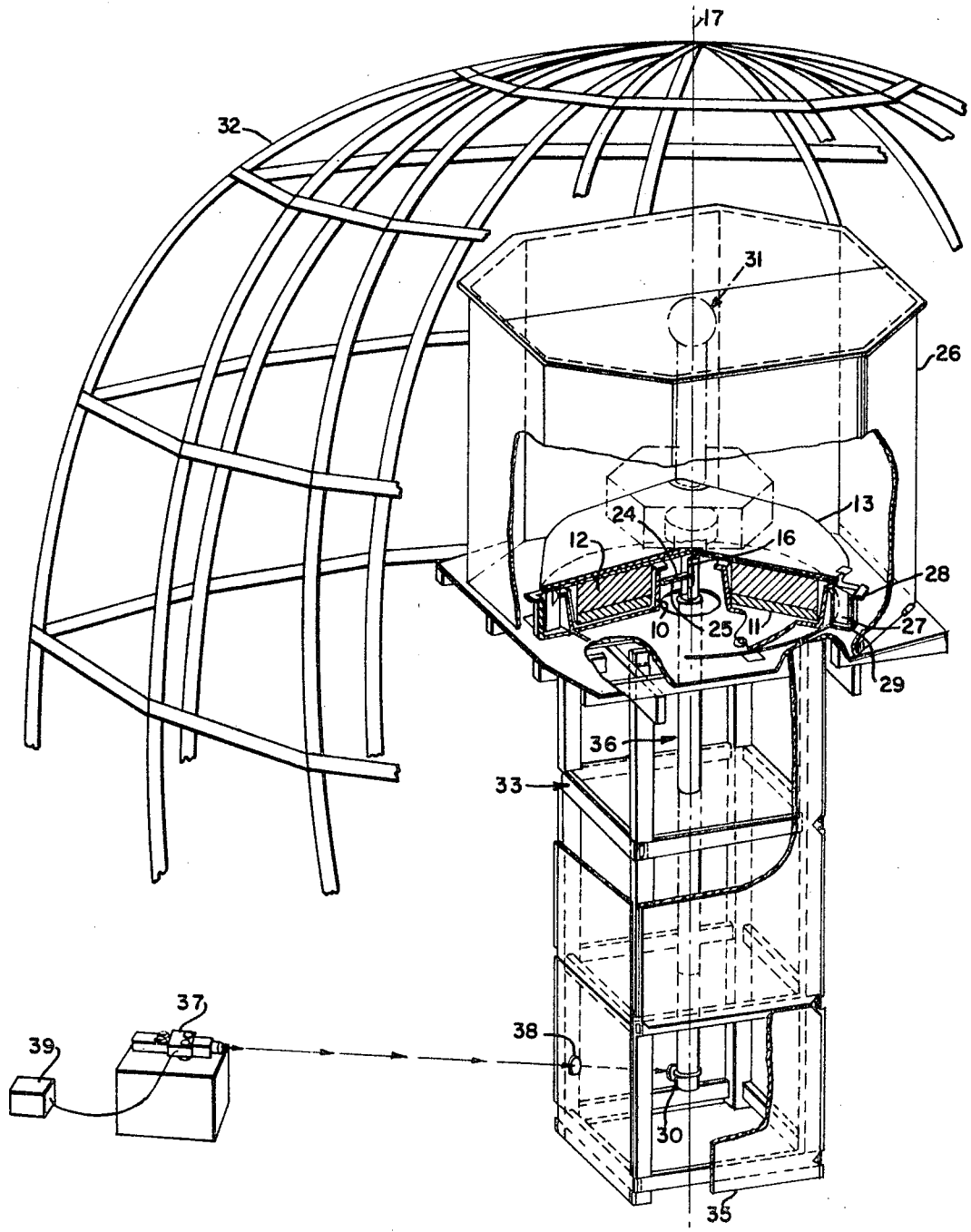
FIGURE 2 is a plan view, in partial section, of the preferred embodiment of the invention shown within a magnetic test facility.

FIGURE 2 illustrates the manner in which the torque meter is specifically adopted to perform magnetic moment measurements upon a spacecraft. All materials are selected for their nonmagnetic and nonconductive properties insofar as is practical. For example, pontoon 12, made of polystyrene foam, is hydrostatically supported within the fiberglass annular basin 10 with a plywood frame 13 mounted thereupon. The torsion wire 16, made of quartz or nonmagnetic beryllium copper having low hysteresis losses, is restrained in torsion by the pair of parallel flexure fiber glass members 24 and 25, respectively. In this embodiment, the annular fiber glass basin 10 is affixedly attached on the other end of the parallel flexure members 24 and 25 and the basin 10 therefore becomes the fixed station. In order to place the spacecraft specimen 31 at the center of the magnetic facility 31 and to isolate the spacecraft from disturbing aerodynamic effects, a stable wooden pedestal 33 with an upper wooden airshield assembly 26 and plywood side panels 35 are provided. In use, the temperature difference between the inside and outside of the airshield assembly 26 is maintained at an appropriately small value to avoid torques induced by convection air currents. The newtonian fluid 11 within the annular basin 10 is preferably water because of its convenience in use. The damper basins 28, constructed as a plurality of protuberances along the periphery of the annular basin 10, use water as the damping fluid 29. The fiber glass damper paddles 27 are adjustably immersible within the damper basin 28 to provide for damping factor variation. Reference mirror 30 which indicates motion about the torquemeter center line 17 is mounted on the bottom of a plastic or fiber extension or sting 36, the opposed end of the sting 36 being affixedly attached to the torsion bracket 18 at its lower arm 19. The autocollimator 37 aligned through porthole 38 with the reference mirror 30 provides an electrical error signal to recorder 39 whereby any angular motion of the mirror 30 from the preestablished alignment is continuously transcribed.

Calibration of the torquemeter of FIGURE 2 has been accomplished by a number of independent methods. First, the torquemeter can be considered an absolute instrument since its sensitivity can be calculated from direct measurements of the dimensions of the device including the diameter of the torsion wire and knowledge of its modulus of rigidity. However, additional methods of calibration for determining the torquemeter sensitivity have also been employed, which in combination with an error analysis, closely correlate with the calculated values and which show that the sensitivity of this embodiment is linear with dependable repeatability and fine resolution, i.e., a small model had a sensitivity of 8.8 dyne-cm./arc second and a larger model had a sensitivity of 23.02 dyne-cm./arc second with a repeatability of ±50 dyne-cm. and a resolution of ±10 dyne-cm.

As an illustration of the practical application of the method and apparatus described, assume that magnetic moment measurements are to be made on a spacecraft. The equivalent permanent dipole moment of a spacecraft is a vector that can be resolved into components along the body axes. These components can be determined from the torque generated about the vertical axis, when the spacecraft is oriented with the body axis of interest in a horizontal plane and where the magnetic field vector is horizontal, preferably at right angles to the body axis. This requires two orientations of the spacecraft on the torquemeter. In general, both an equivalent permanent and an induced dipole moment will be present. Barring saturation effects, these can be separated by the following two-measurement techniques. The first torque measurement will result in a total magnetic torque, $$L = M \times H$$

and, where M and H are orthogonal, $$M_1 = \frac{L_1}{H} = M_p + M_i$$

H = magnetic field intensity
L = torque
M = total equivalent magnetic dipole moment
$M_i$ = induced equivalent magnetic dipole moment
$M_p$ = permanent equivalent magnetic dipole moment If the direction of the magnetic field vector is reversed, the torque due to the induced dipole moment will not reverse. Thus, $$M_2 = \frac{L_2}{H} = -M_p + M_i$$

which yields $$M_p = \frac{M_1 - M_2}{2} = \frac{L_1 - L_2}{2H}$$

$$M_i = \frac{M_1 + M_2}{2} = \frac{L_1 + L_2}{2H}$$

The invention provides therefore, an apparatus for determining the magnitude of very small torques acting upon a large mass by hydrostatically supporting said mass in a nonshear resistive manner, and by providing a soft compliant member for supplying the resistive torques in a measurable manner, thus enabling direct measurement of the torque acting on the mass. While the specific embodiment has been described with particularity for the purpose of explaining the invention, it is not so limited, and modifications and variations thereof should be obvious to those skilled in the art. For example, while the apparatus has been described as employing an enclosed pontoon float member, the invention may find utility where the pontoon member may be internally pressurized and may be constructed with an open bottom. Likewise, transducers other than the mirror-autocollimator combination may be used. For example, a differential capacitor in an A.C. bridge circuit, a differential transformer in an A.C. bridge circuit, a strain gage system or piezoelectric transducer or an optical lever or interferometer are among other possible alternatives. In addition the invention may be utilized for the study of perturbation torques arising from any source.

What is patented as new and desired to be secured by Letters Patent of the United States is:

1. Apparatus comprising:
   a first container having an open top, said first container immovably connected to a fixed station;
   a hydraulic fluid confined within said first container;
   a pontoon floated upon said first fluid and being adapted for rotation;
   damper means interposed between said pontoon and said fixed station for absorbing the energy of relative motion therebetween;
   a torsion resistive member, connected to both the pontoon and said fixed station; and
   a reference marker, said reference marker being affixed to said pontoon so that the angular displacement between said pontoon and said first container can be measured.

2. Apparatus comprising:
   a first container having an open top, said first container being mounted upon a fixed station;
   a first fluid confined within said first container having a known specific gravity;
   a pontoon floated upon said first fluid, said pontoon having a central axis and a specific gravity less than said first fluid and being adapted to rotate about said central axis;
   a frame, said frame being substantially completely supported by said floated pontoon;
   a torsion member having a first end, said first end being affixedly connected to said frame at a first point along said central axis and said torsion member being affixedly attached to said fixed station at a second point along said central axis; and
   a reference marker, said marker being connected to said frame.

3. Apparatus as defined in claim 2, wherein:
   a velocity type damper is affixedly connected between said frame and said fixed station.

4. Apparatus as defined in claim 3, wherein said velocity type damper comprises:
   a second fluid container having an open end;
   a second fluid confined within said second container;
   a paddle, said paddle being adjustably connected to said frame on one end, and immersed in said second fluid adjacent said second end.

5. Apparatus as defined in claim 4, wherein:
   said first container comprises inside and outside concentric cylindrical walls having a space therebetween and a bottom wall between said two concentric cylindrical walls, said inside concentric cylindrical wall defining a central passageway through said first container;
   a bracket, said bracket being a rigid U-shaped member having two arms and being affixedly connected by one arm to said frame and being positioned within said central passageway through said first container;
   said torsion member having a first and second end and a center point therebetween, said first end being affixedly attached to one arm of said bracket and said second end being affixedly attached to the other arm of said bracket;
   a single axis flexure member, said flexure member being attached between said center point of said torsion member and said fixed station.

6. Apparatus as defined in claim 2, wherein:
   said reference marker comprises a member having a reflective characteristic;
   a collimator, said collimator directed along a radial reference line which intersects said central axis and which is perpendicular to a surface of said reflective member whereby small angular deviations of said reflective member are measurable.

References Cited

UNITED STATES PATENTS

| | | | |
|---|---|---|---|
| 831,794 | 9/1906 | Lohle | 308—9 |
| 2,498,995 | 2/1950 | Manning | 73—117.4 |
| 2,574,795 | 11/1951 | Miller | 73—133 XR |
| 2,614,184 | 10/1952 | Robinson | 308—9 XR |
| 2,634,120 | 4/1953 | Ouaida | 177—207 |
| 2,643,543 | 6/1953 | Herzog | 73—59 |
| 3,200,633 | 8/1965 | McCoy | 73—9 |

CHARLES A. RUEHL, Primary Examiner

U.S. Cl. X.R.

73—117; 308—9; 324—34